United States Patent [19]

Rauch

[11] Patent Number: 5,120,156
[45] Date of Patent: Jun. 9, 1992

[54] SUBMERGED BREAKWATER AND BARRIER REEF

[76] Inventor: Hans G. Rauch, 426 Wayman Cir., West Palm Beach, Fla. 33406

[21] Appl. No.: 576,598

[22] Filed: Aug. 31, 1990

[51] Int. Cl.⁵ .............................................. E02B 3/06
[52] U.S. Cl. ........................................ 405/25; 405/30
[58] Field of Search ........................ 405/21, 23, 25, 30, 405/31, 34, 35, 115, 116, 117

[56] References Cited

U.S. PATENT DOCUMENTS

| | | | |
|---|---|---|---|
| 919,788 | 4/1909 | Smith | 405/31 |
| 1,175,962 | 3/1916 | Latham | 405/31 |
| 3,490,239 | 1/1970 | Vincent | 405/31 |
| 4,031,676 | 6/1977 | Dally | 405/31 X |
| 4,367,978 | 1/1983 | Schaaf et al. | 405/21 X |
| 4,407,608 | 10/1983 | Hubbard | 405/25 X |
| 4,498,805 | 2/1985 | Weir | 405/31 |
| 4,502,816 | 3/1985 | Creter et al. | 405/25 X |
| 4,729,691 | 3/1988 | Sample | 405/21 |
| 4,776,725 | 10/1988 | Brade | 405/31 |
| 4,818,141 | 4/1989 | Rauch | 405/21 X |

FOREIGN PATENT DOCUMENTS

| | | | |
|---|---|---|---|
| 745208 | 5/1933 | France | 405/31 |
| 1056674 | 3/1954 | France | 405/35 |
| 0179920 | 10/1984 | Japan | 405/23 |

*Primary Examiner*—Randolph A. Reese
*Assistant Examiner*—Arlen L. Olsen
*Attorney, Agent, or Firm*—Malin, Haley, McHale, DiMaggio & Crosby

[57] ABSTRACT

The invention is a combination submerged breakwater and barrier reef comprised of a plurality of modules. Each module is placed upon the seabed, and includes angle base with gripping toes to prevent movement. The base supports a generally crescent shaped, concave seaward face and a similar crescent shaped, concave beachward face. The beachward face includes an elongated apron to further stabilize the unit, and has a greater degree of curvature when compared to the seaward face. Each module also includes a plurality of channels which are angularly expanding towards the beachward face, and provide passages for wave portions to flow through the reef further collapsing the wave in a desired manner. The modules also include interlocking members which allow for the reef to be constructed along a continuous, axial line, or alternatively staggered to provide a non-uniform reef.

13 Claims, 6 Drawing Sheets

FIG. 7B

SUBMERGED BREAKWATER AND BARRIER REEF

BACKGROUND OF THE INVENTION

1. Field of the Invention

This invention relates to a submerged breakwater and barrier reef designed to prevent shoreline deterioration and beach erosion in coastal areas. Beach environments throughout the United States, and the world at large, are faced with the problem of rapidly deteriorating beaches. This is a result of the surf phenomenon wherein wave energy is dissipated directly upon the beach, in surf zones, with the concomitant effect of degradation to the shoreline and sandy beach areas.

Surf waves continuously pound the shoreline, albeit at differing intensity levels from low tide to high tide. As wave energy is dissipated longshore and onshore-offshore currents are created which disturb and redistribute sediment near the shoreline. These currents are the dominant factor in beach erosion. A gradual and cumulative erosion takes place, often resulting in the devastation of beach areas. For example, the town of Palm Beach, Fla. has witnessed in recent years the total elimination of its sandy beach areas in prominent tourist districts.

Municipalities, counties, states, and governmental agencies have been seeking a solution for the cure and prevention of beach erosion problems for many years. One conventional solution is to rejuvenate the beaches through the transport of sediment from foreign areas to the problem zones by shipping and trucking, or alternatively through pumping operations. This has proven to be enormously expensive, and only provides a temporary solution to the problem because the beach erosion process begins anew once the rejuvenation has been completed.

Other attempted solutions involve coastal structures such as sea walls, groins, and other artificial barriers, none of which have proven to be a viable, long term solution. Submerged breakwaters of various constructions have also been used. None have been widely accepted as a tested and proven answer to the coastal problems. This invention is the result of years of research, testing, and development, and is believed to be the practical solution without negatively affecting the marine environment.

2. Description of Related Art

Numerous patents relate to shoreline breakwaters and/or erosion prevention devices. The most relevant reference relating to the instant invention is U.S. Pat. No. 4,818,141 ('141 Patent) which discloses a prefabricated erosion prevention device. The ,141 Patent issued to Hans G. Rauch, inventor of the barrier reef disclosed in this application. It was a result of the research and testing of the prefabricated erosion prevention device which lead to the development of the this invention. Significant structural and functional improvements in the barrier reef enhance its performance while eliminating deficiencies in the prior art.

Although the instant invention is distinct in terms of structure and function when compared to the device disclosed and claimed in the '141 Patent, there are some similarities. For example, the general method of preventing beach erosion, and the general principles of operation of the concave seaward face remain the same. There are, however, critical advantages of the instant barrier reef which will be discussed below. For purposes of a complete disclosure, and to refer to similar features of the previous invention, the '141 Patent is hereby referenced.

Other shoreline breakwaters can be found in a variety of configurations. For example, Hubbard U.S. Pat. No. 4,407,608; Weir U.S. Pat. No. 4,498,805; Schaaf et al. U.S. Pat. No. 4,367,978; Schaaf et al. U.S. Pat. No. 4,711,598; and Creter U.S. Pat. No. 4,502,816 all disclose devices for controlling beach erosion or coastal problems. None of these devices have withstood the test of time, nor have they proven to be effective solutions.

It is therefore highly desirable to provide a combination submerged breakwater and barrier reef exhibiting optimal performance characteristics in dissipating wave energy while avoiding undesirable effects upon the natural aquatic environment.

It is also highly desirable to provide a combination submerged breakwater and barrier reef which is securely positioned upon the seabed and adequately stabilized to resist unwanted movement.

It is also highly desirable to provide a combination submerged breakwater and barrier reef having a construction which only reduces wave energy to a desired level by allowing a portion of the energy to be transmitted towards the shore, and deflecting a portion of the energy resulting in the waves breaking prematurely.

It is also highly desirable to provide a combination submerged breakwater and barrier reef which is operationally efficient, yet cost effective.

It is also highly desirable to provide a combination submerged breakwater and barrier reef that solves the problems of coastal degradation yet does not negatively affect the aquatic environment and marine life.

It is also highly desirable to provide a combination submerged breakwater and barrier reef that simulates natural and coral reefs, and enhances marine life.

Finally, it is highly desirable to provide a combination submerged breakwater and barrier reef which incorporates all of the above mentioned features.

SUMMARY OF THE INVENTION

It is therefore an object of the invention to provide a combination submerged breakwater and barrier reef which exhibits optimal performance characteristics in dissipating wave energy while avoiding undesirable effects upon the natural aquatic environment.

It is also an object of the invention to provide a combination submerged breakwater and barrier reef which is securely positioned upon the seabed and adequately stabilized to resist unwanted movement.

It is also an object of the invention to provide a combination submerged breakwater and barrier reef having a construction which only reduces wave energy to a desired level by allowing a portion of the energy to be transmitted towards the shore, and deflecting a portion of the energy resulting in the waves breaking prematurely.

It is also an object of the invention to provide a combination submerged breakwater and barrier reef which is operationally efficient, yet cost effective.

It is also an object of the invention to provide a combination submerged breakwater and barrier reef that solves the problems of coastal degradation yet does not negatively affect the aquatic environment and marine life.

It is also an object of the invention to provide a combination submerged breakwater and barrier reef that simulates natural and coral reefs, and enhances marine life.

Finally, it is an object of the invention to provide a combination submerged breakwater and barrier reef which incorporates all of the above mentioned features.

Briefly, what is provided is a barrier reef with enhanced performance characteristics. The construction of the instant invention provides stabilized modules which can be connected in an interlocking fashion with several similar modules. The modules can be aligned such that the reef is one continuous and uniform structure, or alternatively the modules can be staggered to provide a non-uniform barrier to an oncoming wave. The reef is highly stable, and dissipates a predetermined and optimal portion of wave energy, by allowing a portion of wave energy to be transmitted and simultaneously deflecting the remaining portion. In this manner the naturally occurring wave phenomenon is altered in minimum fashion and only to an extent that is necessary to prevent beach erosion. The construction of this reef is also designed to actually enhance the marine environment by simulating a naturally occurring reef, which allows for the development of aquatic life such as fish, turtles, and marine plant life amongst others.

The invention also provides superior performance to prior devices through several features designed to stabilize and anchor the device. Additionally, the construction controls the wave forces such that zones of minimal turbulence are maintained.

The modules are designed to be placed 2-to-4 feet below the mean low water line (MLWL).

Each module is placed upon the seabed, and includes an angle base with ripping toes to prevent movement. The base supports a generally crescent shaped, concave seaward face and a similar crescent shaped, concave beachward face. The beachward face includes an elongated apron to further stabilize the unit, and has a greater degree of curvature when compared to the seaward face. Each module also includes a plurality of channels which are angularly expanding towards the beachward face, and provide passages for wave portions to flow through the reef further collapsing the wave in a desired manner. The modules also include interlocking members which allow for the reef to be constructed along a continuous, axial line, or alternatively staggered to provide a non-uniform reef.

DETAILED DESCRIPTION OF PREFERRED EMBODIMENT(S)

Figure 1:
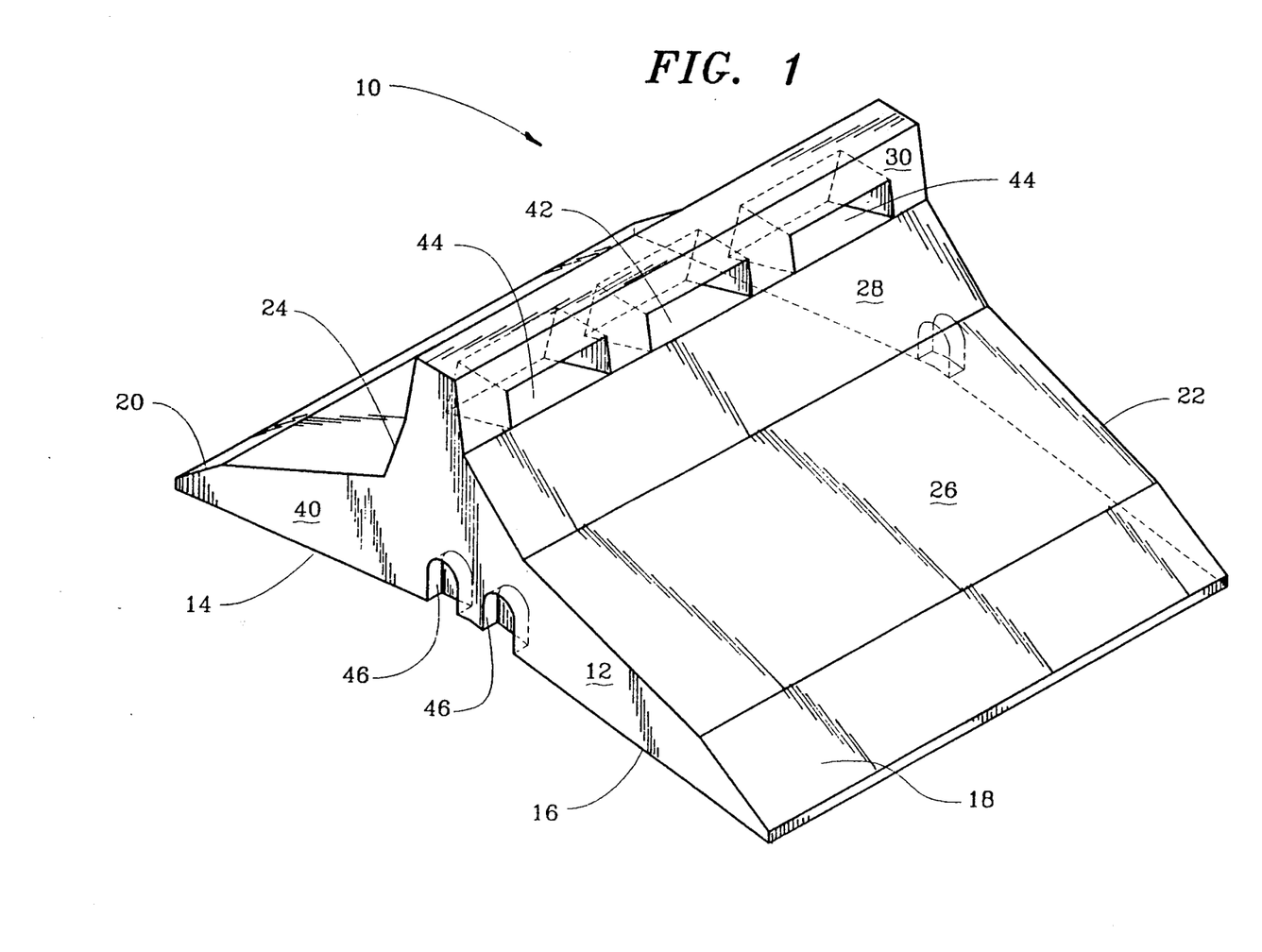
FIG. 1A is a perspective view of a reef module generally illustrating its seaward face.
FIG. 1B is a perspective view of an alternative embodiment of the reef shown in FIG. 1.
Figure 2:
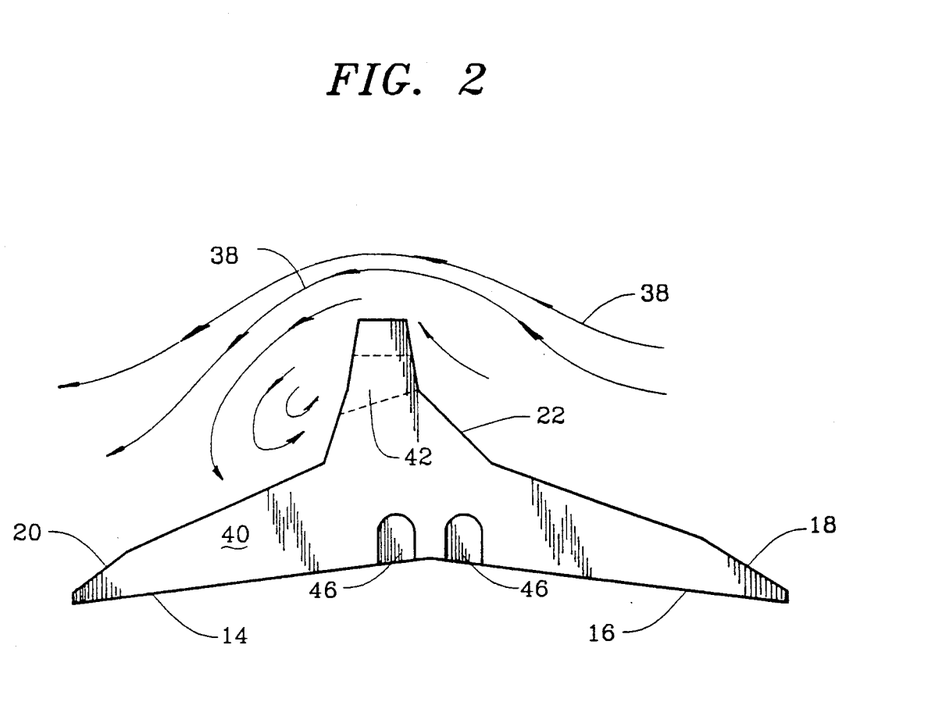
FIG. 2 is a left side view of the reef module illustrated in FIG. 1.
Figure 3:
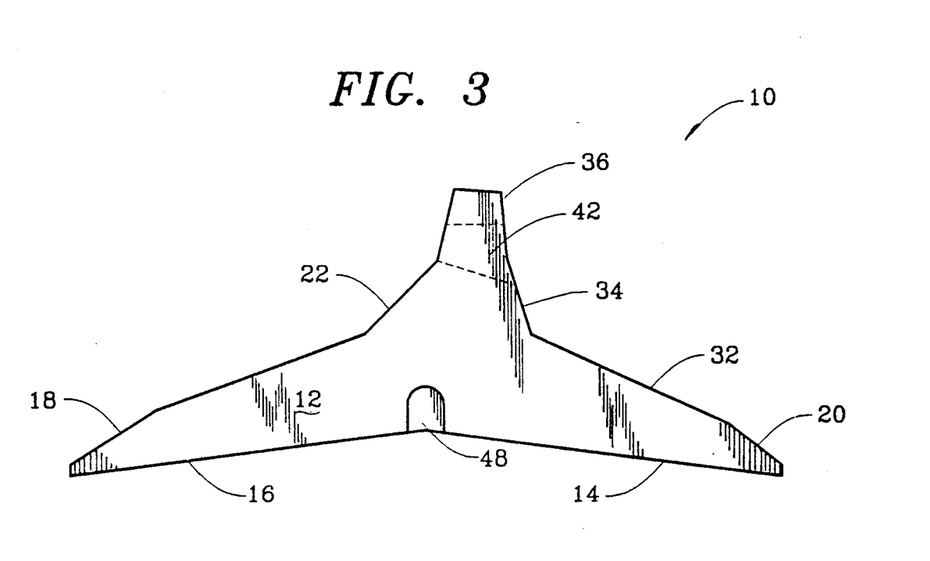
FIG. 3 is a right side view of the reef module illustrated in FIG. 1.
Figure 4:
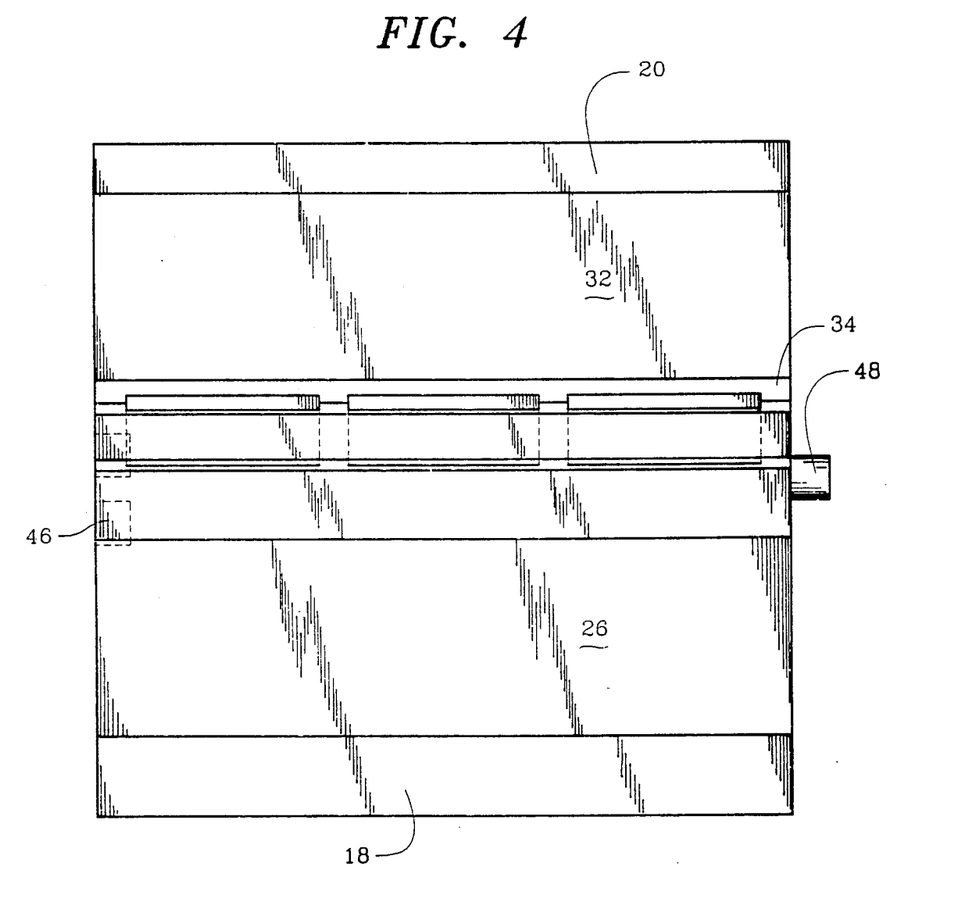
FIG. 4 is a top plan view of the reef module.
Figure 5:
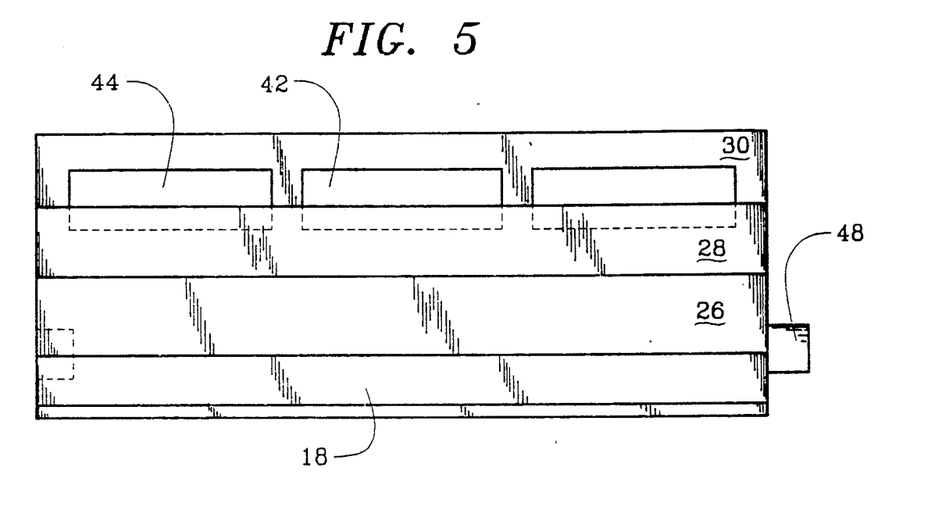
FIG. 5 is a front elevational view with the barrier reef illustrated in FIG. 1.

Referring now to FIGS. 1, 2, and 3, barrier reef module 10 is shown having a base 12. The module 10 is constructed as an integral unit, with base 12 providing its stability and securing the module to the seabed. Base 12 includes a bottom surface comprised of angled planes 14 and 16 which allow the unit to securely grip the ocean floor. The angled bottom of the module provides a degree of inherent stability which would be absent in a unit having a uniform, planar base. Base 12 is also illustrated with toes 18 and 20 which further act to prevent movement and scouring as will be discussed in detail hereinafter.

A variety of obtuse angles could be utilized with respect planes 14 and 16, which will depend upon the placement of the reef in particular waters, and a consideration of the nature of the local surf zones and the wave intensity. As will be apparent to those of ordinary skill in the art, differing surf zones will dictate the requirements precise construction.

Reef module 10 includes seaward face 22 and beachward face 24. In accordance with applicant's prefabricated erosion prevention device disclosed in U.S. Pat. No. 4,818,141, the seaward face 22 is a generally crescent shaped, concave surface which approximates an exponential curve.

The general principles of the wave energy dissipation, and the exponential curvature of the seaward face are discussed in detail in the '141 Patent. FIG. 2 illustrates the generally exponential curvature of seaward face 22 when viewed either from the side or in cross-section.

Beachward face 24 is also illustrated as being crescent shaped and generally exponential in cross-section. It can be seen, in a preferred embodiment, that the curvature of the beachward face is greater than the curvature of the seaward face for reasons relating to the stability of the unit and allowing the module to accommodate wave forces after they have passed over the top of the unit towards the shoreline, which is further discussed below.

The barrier reef modules are constructed such that the concave surfaces of seaward face 22 and beachward face 24 are diametrically positioned in opposite directions. It can be seen that the toes 18 and 20 run along the lowermost portion of the seaward face and beachward face, respectively.

In a preferred embodiment the concave seaward face 22 is constructed of three sequentially spaced planar surfaces 26, 28 and 30; beachward concave face 24 is constructed of three sequentially positioned planar surfaces 32, 34 and 36. These planar segments are incorporated to simplify the manufacturing process. It will be recognized by those of ordinary skill in the art, that it is more cost effective to pour a concrete structure utilizing planar surfaces than it is to develop and manufacture a device having a surface of continuous curvature or one following an exponential gradient. Although comprised of planar segments, both the seaward face 22 and beachward face 24 approximate exponential curves which are extremely important to the reef's operation.

With particular reference to FIG. 3, it can be seen that the submerged barrier reef is rearwardly loaded and provides a bias about the beachward face. This offset loading creates a center of gravity which is offset about the longitudinal axis of the unit. The offset center of gravity provides further stability for the reef when encountering an incoming wave. It can also be seen that the beachward and seaward faces are non-symmetrical, incorporating differing curvatures which are formed by the respective planar segments. The differing curvature of the seaward face, along with the offset center of gravity, combine to control the reduction of wave energy in the manner further described herein.

The design and operation of the beachward face 24 is critical, and operates to enhance the function of the seaward face 22. Curve lines 38 of FIG. 2 generally illustrate wave forces as they encounter, and pass over, the reef modules. As can be seen, the beachward face provides a backwash pressure reduction by increasing circulation directly behind the reef. Instead of the surf waves proceeding directly towards the shoreline, a portion of the wave energy is circulated around, and actually back towards, the seaward face. This circulation behind the reef module further provides for "wave collapse" which is a desired effect. The device operates to transmit a portion of the wave energy, deflect a portion of the wave energy, and collapse a portion of the wave energy in a downward fashion as it passes over the reef.

Apron 40 provides a significant stabilizing element by receiving the impact of a portion of the wave that is circulated behind the reef, as shown in FIG. 2. Apron 40 breaks the wave's impact behind the reef and prevents scouring in the ocean floor on the beachward side. Without the presence of the apron, the circulated wave forces would literally dig a trench behind the unit which would ultimately lead to movement and destabilization.

Reef modules 10 are also illustrated having channel means 42. In a particular embodiment, channel means 42 is comprised of a plurality of rectangular cavities 44 which are interposed seaward face 22 and beachward face 24. The cavities 44 are voids which allow a portion of the surf waves to flow directly through the reef. This has several effects. First, the channels operate as pressure relief chutes and diminish the naturally occurring pressure gradient. As waves encounter the reef, a high pressure front exists at the seaward face, and a correspondingly lower pressure exists at the beachward face. This pressure gradient is transferred from front to back as the waves pass over the reef. The cavities 44 operate to relieve the pressure gradient, and tend to bring about an equilibrium by collapsing the high pressure front. As a portion of the wave is allowed to immediately pass through the unit, this lessens the pressure present at the seaward face. The cavities 44, also act to control the backwash circulation that occurs at the beachward face 24.

Each cavity 44 has an inlet at the seaward face and an outlet at the beachward face, and in the preferred embodiment the cavities are angularly expanding toward the beachward face as illustrated in FIG. 2. It can be seen that without the channel means 42, the front pressure on the seaward face would intensify, and thereby tend to destabilize the barrier reef.

The reef modules 10 also incorporate a plurality of female members 46 and male member 48. When several modules are juxtaposed to form a continuous reef, the interlocking means operates to further secure the reef and prevent one or more modules from being displaced and thereby damaging the reef.

A plurality of female members 46 are provided to allow for the "staggering" of modules. The female members 46 are voids within base 12. The male members 48 protrude from the base 12 on the opposite side, and are of a shape corresponding to the voids 46. When two modules are placed side by side, the male member 48 is placed within a select female cavity 46. It can be seen that this operates in a tongue and groove fashion, such that when a wave encounters the reef, any one module is prevented from moving.

Figure 1B:
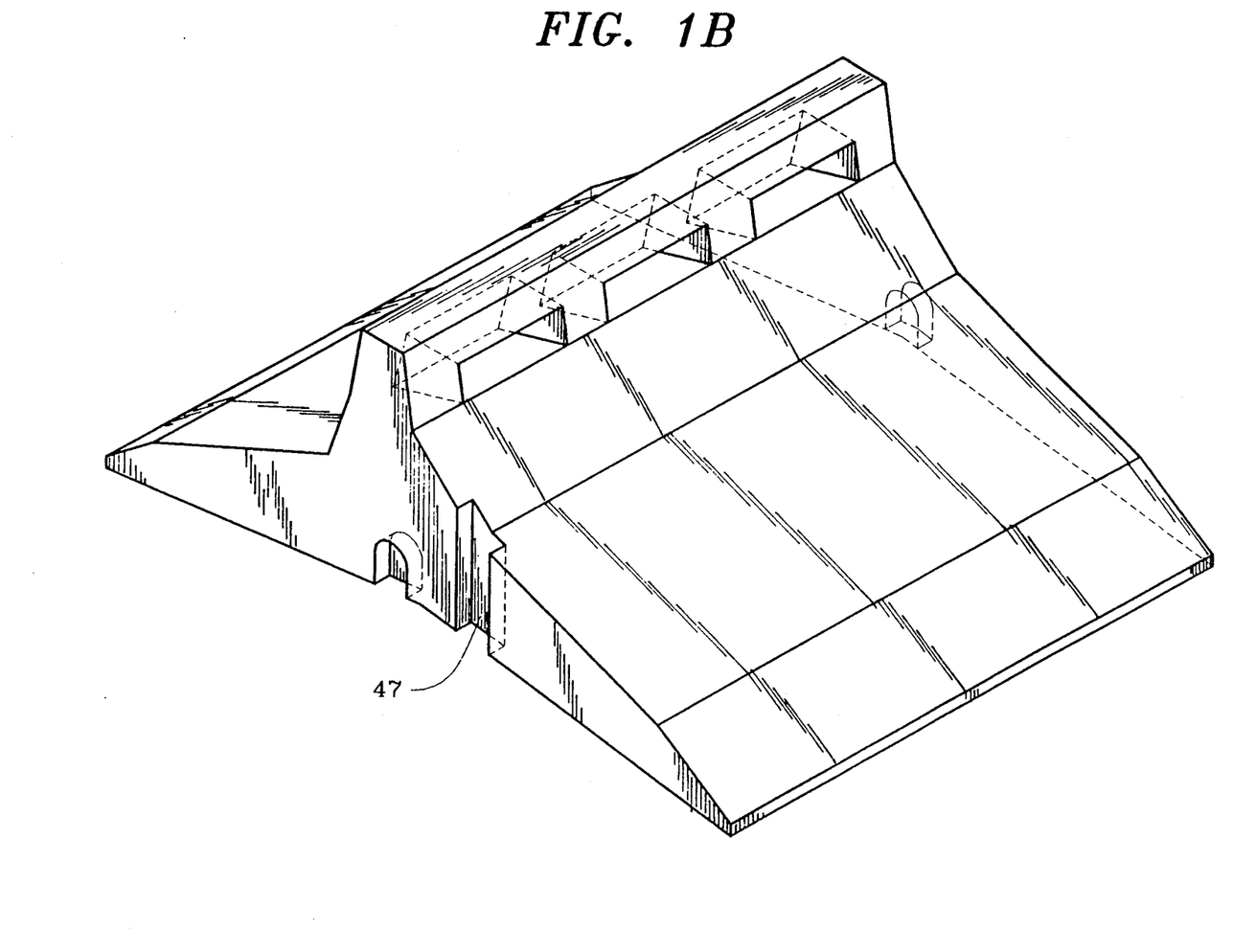

FIG. 1B illustrates an alternative embodiment of the invention wherein female member 47 is of an alternate design. In this configuration the void in the base of the module protrudes upward through a portion of the concave seaward face. This provides the additional ability of either removing one individual module from a constructed reef for maintenance, testing and the like, or for replacing a unit within a complete reef without disturbing the other modules.

Figure 7A:
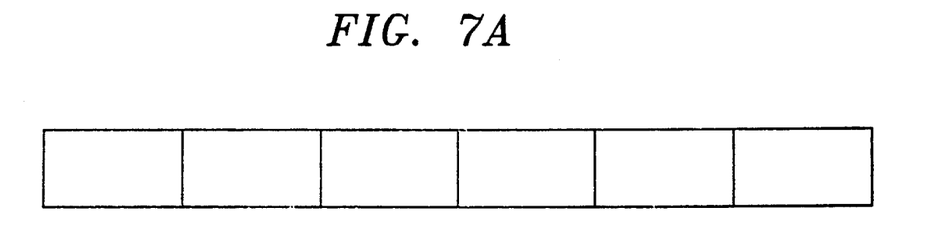
FIG. 7A is a top plan view of a plurality of modules forming a uniform reef.
Figure 7B:
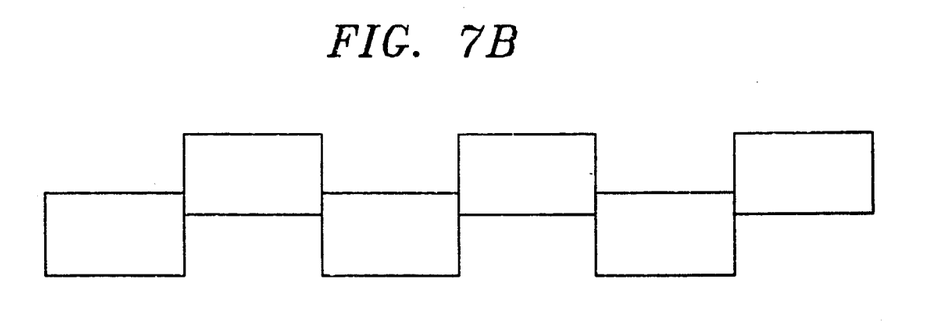
FIG. 7B is a top plan view illustrating the staggered placement of modules forming a non-uniform reef.

With reference to FIG. 7A, several independent modules 10 are placed side by side, forming a barrier reef that has a uniform axis. In contrasting fashion, FIG. 7B illustrates several reef modules 10 being positioned in a staggered fashion, such that a non-uniform reef is created. In certain ocean environments, this has the added advantage of providing a non-uniform barrier to reduce the impact of a wave sequentially. That is, the staggered reef breaks up a wave in two sequences as the entire wave passes over a complete reef. The totality of the wave energy is not absorbed instantaneously, and therefore controls the wave. This staggered placement also compensates for waves of varying angles of attack. In differing atmospheric conditions, waves do not often approach the shoreline in a parallel manner. The axis of the on-coming wave can have an angular relationship to the coastline, such that any reef that compensates for the changes in the angle of attack will automatically operate in a superior fashion.

Figure 6:
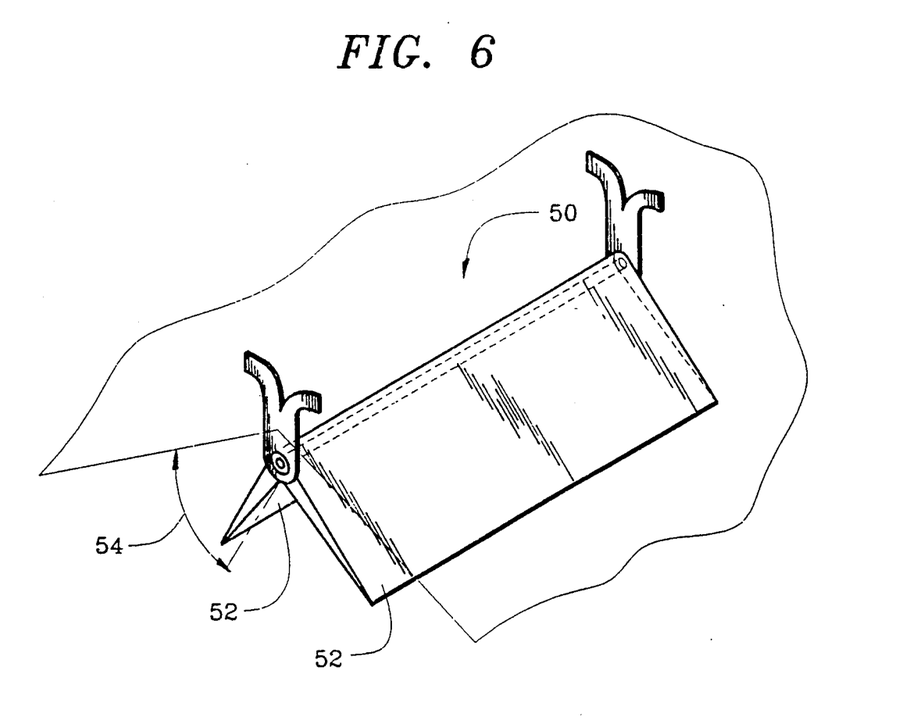
FIG. 6 is a fragmented, perspective view of the anchoring means of the instant invention.

Referring now to FIG. 6, the anchoring means of the instant invention is illustrated. In a preferred embodiment, anchoring means 50 is comprised of a plurality of plates 52 which are hingedly affixed to base 12. The plates 52 can be rotated along curvature 54, and can be selectively placed to be sunk into the ocean floor, anchoring the unit. The anchoring means 50 provides further stability for the unit in times of heavy seas, storms, hurricanes or the like. The anchoring plates 52 can be molded into the forms and integrally constructed with the modules.

The instant invention was designed to improve the performance of the reef disclosed in the '141 Patent. After extensive testing and analysis of the reef in the ocean environment, several structural and functional design changes were incorporated in the instant invention. The reef modules were designed to provide greater stability in numerous features. The weight of the units were substantially increased, and incorporated interlocking features. The center of gravity of the reef was also lowered. This required that design considerations compensate for the changes, and still provide for the wave energy dissipation features of the previous erosion prevention device. These objectives were accomplished by providing a beachward face of an exponential curvature, channel means to reduce pressure gradients, along with an angled base to secure the unit to the sea floor. In a particular embodiment, the unit is 12 feet long by 15 feet wide, and constructed of concrete, each module weighing approximately 22 to 26 tons.

Modifications to the instant invention shall be incorporated to account for particular changes in the coastal environment and beach conditions. However, while there have been described above the principles of this invention in connection with specific apparatus, it is to be clearly understood that this description is made only by way of example and not as a limitation to the scope of the invention.

What is claimed is:

1. A submerged breakwater and barrier reef module, said reef being placed upon the seabed for protecting shorelines from the deleterious effects of wave energy including beach erosion, comprising:

a substantially solid base, said base having a bottom surface and securing said module to said seabed;

said base supporting a generally crescent shaped, concave seaward face and a generally crescent shaped, concave beachward face, said seaward face and beachward face being diametrically positioned;

said seaward face for initially receiving an oncoming wave and partially dissipating said wave energy;

said base, seaward face and beachward face being integrally associated, said module constituting a unitary device, said seaward face and said beachward face being of non-symmetrical curvature about the longitudinal axis running generally from said seaward face to said beachward face, said barrier reef module being rearwardly loaded toward said beachward face and having an offset center of gravity along said longitudinal axis, said offset loading further stabilizing said reef.

2. The apparatus of claim 1, further comprising channel means for providing a controlled passage through which a portion of said wave may travel, said channel means interposed said seaward face and said beachward face, wherein said channel means comprises a plurality of discrete cavities, each said cavity having an inlet at said seaward face and an outlet at said beachward face, said cavities expanding toward said outlet.

3. The apparatus of claim 1 further comprising:
interlocking means for securely connecting one said module to another in forming said reef.

4. The apparatus of claim 3 wherein said interlocking means comprises a plurality of female members formed within said base on one side of said module, and at least one male member protruding from said base on the opposite side of said module; the female member of one module capable of interlocking with the male member of another said module.

5. The apparatus of claim 1 wherein said bottom surface includes a first plane and a second plane, said first and second planes forming an obtuse angle with respect to said seabed, said angled planes further securing said module upon said seabed.

6. The apparatus of claim 5 wherein said base further includes a first angled toe positioned along the lowermost edge of said seaward face, and a second angled toe positioned about the lowermost edge of said beachward face, said first and second toes allowing said base to securely grip said seabed.

7. The apparatus of claim 1 wherein said base further comprising an anchoring means.

8. The apparatus of claim 7 wherein said anchoring means includes a plurality of rotating plates, said plates hingedly affixed to said bottom surface.

9. The apparatus of claim 1 wherein said crescent shaped, concave seaward face is generally exponential in cross-section.

10. The apparatus of claim 9 wherein said crescent shaped, concave seaward face is comprised of a plurality of planar segments.

11. The apparatus of claim 1 wherein said crescent shaped, concave beachward face is generally exponential in cross-section.

12. The apparatus of claim 11 wherein said crescent shaped, concave beachward face is comprised of a plurality of planar segments.

13. A submerged breakwater and barrier reef module, said reef being placed upon the seabed for protecting shorelines from the deleterious effects of wave energy including beach erosion, comprising:

a base, said base having a bottom surface and securing said reef to said seabed;

said base supporting a generally crescent shaped, concave seaward face and a generally crescent shaped, concave beachward face, said seaward face and beachward face being diametrically positioned;

said base, seaward face and beachward face being integrally associated, said module constituting a unitary device, said seaward face and said beachward face being of non-symmetrical curvature about the longitudinal axis running generally from said seaward face to said beachward face, said barrier reef module being rearwardly loaded toward said beachward face and having an offset center of gravity along said longitudinal axis, said offset loading further stabilizing said reef;

said base bottom surface including a first plane and a second plane, said first and second planes forming an obtuse angle with respect to said seabed, said angled planes further securing said module upon said seabed;

interlocking means for securely connecting one said module to another in forming said reef;

said seaward face for initially receiving an oncoming wave and partially dissipating said wave energy, said seaward face and said beachward face being generally exponential in cross-section.

* * * * *